United States Patent
Hashimoto et al.

(10) Patent No.: US 11,170,272 B2
(45) Date of Patent: Nov. 9, 2021

(54) OBJECT DETECTION DEVICE, OBJECT DETECTION METHOD, AND COMPUTER PROGRAM FOR OBJECT DETECTION

(71) Applicant: TOYOTA JIDOSHA KABUSHIKI KAISHA, Toyota (JP)

(72) Inventors: Daisuke Hashimoto, Chofu (JP); Satoshi Takeyasu, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/986,990

(22) Filed: Aug. 6, 2020

(65) Prior Publication Data
US 2021/0042592 A1 Feb. 11, 2021

(30) Foreign Application Priority Data

Aug. 8, 2019 (JP) .............................. JP2019-146020

(51) Int. Cl.
| | | |
|---|---|---|
| *G06K 9/68* | (2006.01) | |
| *G06K 9/62* | (2006.01) | |
| *G06K 9/00* | (2006.01) | |

(52) U.S. Cl.
CPC ......... *G06K 9/685* (2013.01); *G06K 9/00805* (2013.01); *G06K 9/628* (2013.01); *G06K 9/6227* (2013.01); *G06K 9/6228* (2013.01)

(58) Field of Classification Search
None
See application file for complete search history.

(56) References Cited

U.S. PATENT DOCUMENTS

| | | | | |
|---|---|---|---|---|
| 10,032,280 | B2 * | 7/2018 | Piekniewski | ........ H04N 9/7973 |
| 11,049,256 | B2 * | 6/2021 | Itakura | ................ H04N 13/111 |

(Continued)

FOREIGN PATENT DOCUMENTS

| | | | | |
|---|---|---|---|---|
| EP | 3422257 A1 * | 1/2019 | ............... G06N 3/08 |
| EP | 3475848 B1 * | 11/2019 | ......... G06F 16/4393 |

(Continued)

OTHER PUBLICATIONS

Russakovsky et al., ImageNet Large Scale Visual Recognition Challenge, International Journal of Computer Vision, pp. 211-252 (Year: 2015).*

(Continued)

*Primary Examiner* — Mohammed Rachedine
(74) *Attorney, Agent, or Firm* — Hunton Andrews Kurth LLP

(57) ABSTRACT

An object detection device calculates, for each of images acquired in time-series, a confidence score of each of a plurality of types of an object to be detected for each of a plurality of regions on the image, detects the type of the object corresponding to the confidence score in a region in which the confidence score is equal to or higher than a confidence threshold of the type for each of the images, tracks the detected object, counts a frequency of occurrence for each type of the detected object in a period in which the detected object is tracked, and updates the confidence threshold in such a way that the confidence threshold of a type having a higher frequency of occurrence is lower than the confidence threshold of a type having a lower frequency of occurrence.

10 Claims, 9 Drawing Sheets

(56) References Cited

U.S. PATENT DOCUMENTS

| | | | |
|---|---|---|---|
| 2012/0120248 A1* | 5/2012 | Han | G06K 9/00771 |
| | | | 348/169 |
| 2017/0040036 A1* | 2/2017 | Ryu | G11B 27/031 |
| 2019/0197695 A1* | 6/2019 | Itakura | G06K 9/3233 |
| 2019/0370978 A1 | 12/2019 | Hashimoto et al. | |
| 2020/0097739 A1 | 3/2020 | Hashimoto et al. | |
| 2020/0265218 A1* | 8/2020 | Dai | G06K 9/6267 |
| 2021/0052126 A1* | 2/2021 | Santini | A47L 9/0411 |

FOREIGN PATENT DOCUMENTS

| | | | | |
|---|---|---|---|---|
| EP | 3532801 B1 * | 12/2020 | | B60W 30/18163 |
| JP | 2007257133 A | 10/2007 | | |

OTHER PUBLICATIONS

Liu, W., et al., "SSD: Single Shot MultiBox Detector", ECCV2016, 2016, 17 pages.

Ren, S., et al., "Faster R-CNN: Towards Real-Time Object Detection with Region Proposal Networks", NIPS, 2015, 14 pages.

Kendall, A., et al., "Multi-Task Learning Using Uncertainty to Weigh Losses for Scene Geometry and Semantics", CVPR2018, 2018, 14 pages.

Petrovskaya, A., et al., "Model Based Vehicle Tracking for Autonomous Driving in Urban Environments", Robotics: Science and Systems, Computer Science Department, Stanford University, Jun. 2008, 8 pages.

\* cited by examiner

OBJECT DETECTION DEVICE, OBJECT DETECTION METHOD, AND COMPUTER PROGRAM FOR OBJECT DETECTION

CROSS-REFERENCE TO RELATED APPLICATION

This application claims priority to Japanese Patent Application No. 2019 146020 filed on Aug. 8, 2019, which is incorporated herein by reference in its entirety.

FIELD

The present invention relates to an object detection device, an object detection method, and a computer program for object detection for detecting an object represented in an image.

BACKGROUND

A technique for detecting an object represented in sensor information, such as an image acquired by a camera, has been studied. In recent years, in order to detect an object, there have been proposed techniques for improving detection accuracy using a so-called deep neural network (hereinafter, referred to simply as a DNN) (see, e.g., Wei Liu et al., "SSD: Single Shot MultiBox Detector", ECCV2016, 2016 (hereinafter, referred to as NPL 1), Shaoqing Ren et al., "Faster R-CNN: Towards Real-Time Object Detection with Region Proposal Networks", NIPS, 2015 (hereinafter, referred to as NPL 2), Alex Kendall et al., "Multi-Task Learning Using Uncertainty to Weigh Losses for Scene Geometry and Semantics", CVPR2018, 2018 (hereinafter, referred to as NPL 3), and Anna Petrovskaya et al., "Model Based Vehicle Tracking for Autonomous Driving in Urban Environments", Robotics: Science and Systems 2008, 2008 (hereinafter, referred to as NPL 4)).

SUMMARY

Objects of a plurality of types to be detected may include a common feature. In such a case, even when a detection result of a position of an object is correct in any of a time-series of images on which object detection processing is executed, a type of the object represented in the image may be estimated, by mistake, to be another type having a feature common to the object. As a result, a device that executes the object detection processing may fail to track the detected object in the time-series of images, and lose the detected object during the tracking.

Therefore, an object of the present invention is to provide an object detection device capable of improving estimation accuracy of a type of an object to be detected.

According to one embodiment, an object detection device is provided. The object detection device includes a processor configured to calculate, by inputting images acquired in time-series to a classifier that calculates, for each of a plurality of types of an object to be detected, a confidence score indicating a degree of certainty that the type of the object is represented, for each of the time-series of images, the confidence score of each of the plurality of types for a plurality of regions on the image; detect, for each of the time-series of images, in a region in which the confidence score of any of the plurality of types is equal to or higher than a confidence threshold of the type among the plurality of regions on the image, an object of the type; track the detected object, based on the region in which the detected object is represented in each of the time-series of images; count a frequency of occurrence for each type of the detected object in a period in which the detected object is tracked; and update the confidence threshold for at least any of two or more types of the object detected in the tracked period in such a way that the confidence threshold of a type of the object having the higher frequency of occurrence among the two or more types is lower than the confidence threshold of a type of the object having the lower frequency of occurrence among the two or more types. Then, the processor uses the updated confidence threshold for a comparison with the confidence score for a region in which the detected object is estimated to be located in an image acquired after the time-series of images.

In the object detection device, it is preferable that the processor updates, only when there is a predetermined similarity relationship between the two or more types of the object detected in the tracked period, the confidence threshold for at least any of the two or more types.

In this case, it is preferable that the predetermined similarity relationship is set between types of an object having a common feature in terms of an appearance.

In addition, in the object detection device, it is preferable that the processor detects, for each of the time-series of images, in a region in which the confidence score is maximum of two or more regions in which the confidence score of any type belonging to the same class of the plurality of types is equal to or higher than a confidence threshold of the type and a degree of overlapping between each other is equal to or higher than a predetermined overlapping threshold among the plurality of regions on the image, an object of a type corresponding to the maximum confidence score, and updates, only when two or more types of the object detected in the tracked period belong to the same class, the confidence threshold for at least any of the two or more types.

Further, in the object detection device, it is preferable that the period when any of two or more types of the detected object has an appearance feature that varies over time is set to be shorter than the period when none of two or more types of the detected object has an appearance feature that varies over time.

According to another embodiment of the present invention, an object detection device is provided. The object detection device includes a processor configured to calculate, for each of a plurality of types of an object to be detected, by inputting images acquired in time-series to a classifier that calculates a confidence score indicating a degree of certainty that the type of the object is represented, for each of the time-series of images, the confidence score of each of the plurality of types for a plurality of regions on the image; detect, for each of the time-series of images, in a region in which the confidence score is maximum of two or more regions in which the confidence score of any type belonging to the same class of the plurality of types is equal to or higher than a confidence threshold of the type and a degree of overlapping between each other is equal to or higher than a predetermined overlapping threshold among the plurality of regions on the image, an object of a type corresponding to the maximum confidence score; track the detected object, based on the region in which the detected object is represented in each of the time-series of images; count a frequency of occurrence for each type of the detected object in a period in which the detected object is tracked; and update the class in such a way as to include two or more types of the detected object when the frequency of occurrence for each of the two or more types is equal to or higher than a frequency threshold in the tracked period. Then, the processor applies the updated class to a region in which the detected object is estimated to be located in an image acquired after the time-series of images.

In the object detection device, it is preferable that the processor updates, when a first sub-class to which one of the two or more types belongs and in which whether or not the degree of overlapping is equal to or higher than the predetermined overlapping threshold is determined and a second sub-class to which the other one of the two or more types belongs and in which whether or not the degree of overlapping is equal to or higher than the predetermined overlapping threshold is determined are different, the class in such a way that the class includes both of the first sub-class and the second sub-class.

In addition, in the object detection device, it is preferable that the period when any of two or more types of the detected object has an appearance feature that varies over time is set to be shorter than the period when none of two or more types of the detected object has an appearance feature that varies over time.

According to still another embodiment of the present invention, a non-transitory recording medium in which a computer program for object detection is recorded is provided. The computer program for object detection causes a computer to execute: calculating, by inputting images acquired in time-series to a classifier that calculates, for each of a plurality of types of an object to be detected, a confidence score indicating a degree of certainty that the type of the object is represented, for each of the time-series of images, the confidence score of each of the plurality of types for a plurality of regions on the image; detecting, for each of the time-series of images, in a region in which the confidence score of any of the plurality of types is equal to or higher than a confidence threshold of the type among the plurality of regions on the image, an object of the type; tracking the detected object, based on the region in which the detected object is represented in each of the time-series of images; counting a frequency of occurrence for each type of the detected object in a period in which the detected object is tracked; and updating the confidence threshold for at least any of two or more types of the object detected in the tracked period in such a way that the confidence threshold of a type of the object having the higher frequency of occurrence among the two or more types is lower than the confidence threshold of a type of the object having the lower frequency of occurrence among the two or more types. Then, detection of the object uses the updated confidence threshold for a comparison with the confidence score for a region in which the detected object is estimated to be located in an image acquired after the time-series of images.

According to still another embodiment of the present invention, a non-transitory recording medium in which a computer program for object detection is recorded is provided. The computer program for object detection causes a computer to execute: calculating, by inputting images acquired in time-series to a classifier that calculates, for each of a plurality of types of an object to be detected, a confidence score indicating a degree of certainty that the type of the object is represented, for each of the time-series of images, the confidence score of each of the plurality of types for a plurality of regions on the image; detecting, for each of the time-series of images, in a region in which the confidence score is maximum of two or more regions in which the confidence score of any type belonging to the same class of the plurality of types is equal to or higher than a confidence threshold of the type and a degree of overlapping between each other is equal to or higher than a predetermined overlapping threshold among the plurality of regions on the image, an object of a type corresponding to the maximum confidence score; tracking the detected object, based on a region in which the detected object is represented in each of the time-series of images; counting a frequency of occurrence for each type of the detected object in a period in which the detected object is tracked; and updating the class in such a way as to include two or more types of the detected object when the frequency for each of the two or more types is equal to or higher than a frequency threshold in the tracked period. Then, detection of the object applies the updated class to a region in which the detected object is estimated to be located in an image acquired after the time-series of images.

The object detection device according to the present invention provides an advantageous effect of being able to improve estimation accuracy of a type of an object to be detected.

DESCRIPTION OF EMBODIMENTS

An object detection device will be described below with reference to the drawings. The object detection device calculates a frequency of occurrence for each type estimated for an object that is detected from images acquired in time-series and is tracked, on the basis of an estimated result of the type of the tracked object in each of the images. The object detection device then reduces, as the type has a higher frequency of occurrence, a threshold with respect to a confidence score which is calculated for each type of the object to be detected and indicates a degree of certainty that the object of the type is represented, (hereinafter, referred to as a confidence threshold) in an estimated position of the object in an image acquired subsequently. Alternatively, when the tracked object is estimated to be an object of two or more different types during the tracking, the object detection device updates a class being a set of types of an object to which non-maximum suppression (NMS) processing is applied in such a way that the two or more different types are included in the same class, in an estimated position of the object in an image acquired subsequently. In this way, the object detection device can improve estimation accuracy of the type of the object to be detected while limiting a classifier to object detection and type estimation from an individual image, and suppressing an increase in an amount of calculation of the classifier and an increase in a training man-hour of the classifier.

An example in which the object detection device is applied to a vehicle control system will be described below. In the example, the object detection device detects, by executing object detection processing on an image acquired by a camera installed in a vehicle, various types of objects that exist around a vehicle, for example, other vehicles, human beings, road signs, traffic lights, or the like.

First, an object detection device according to a first embodiment will be described. The object detection device according to the first embodiment controls a confidence threshold on the basis of a frequency of occurrence for each type estimated for a detected object in tracking of the object.

Figure 1:
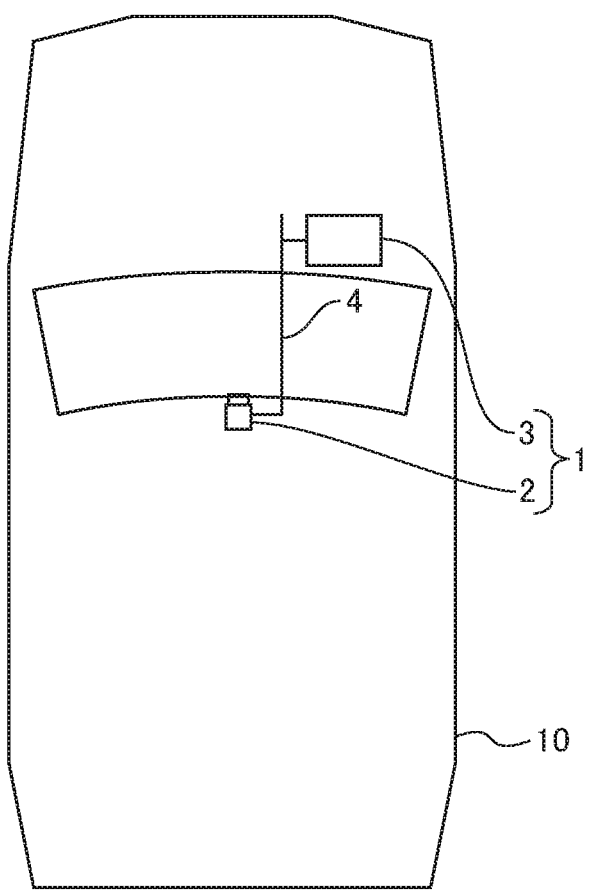
FIG. 1 is a schematic configuration diagram of a vehicle control system in which an object detection device is installed.
Figure 2:
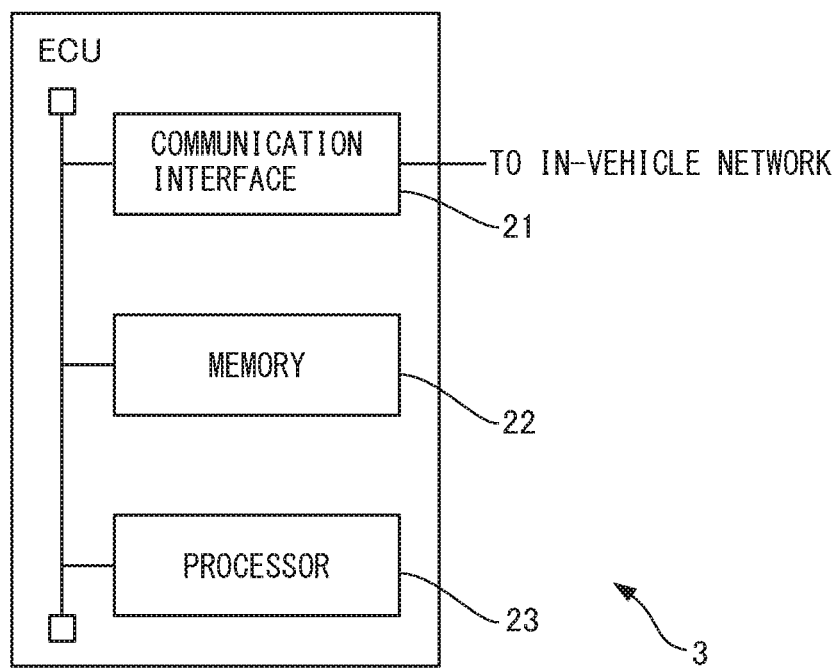
FIG. 2 is a hardware configuration diagram of an electronic control unit being a first embodiment of the object detection device.

FIG. 1 is a schematic configuration diagram of a vehicle control system in which the object detection device is installed. Further, FIG. 2 is a hardware configuration diagram of an electronic control unit being the first embodiment of the object detection device. In the present embodiment, a vehicle control system 1 that is installed in a vehicle 10 and controls the vehicle 10 includes a camera 2 for imaging the surroundings of the vehicle 10 and an electronic control unit (ECU) 3 being one example of the object detection device. The camera 2 and the ECU 3 are communicably connected via an in-vehicle network 4 conforming to a standard such as a Controller Area Network.

The camera 2 is one example of an imaging unit which is a sensor for detecting an object existing in a predetermined detection range, and includes a two-dimensional detector configured with an array of photoelectric conversion elements having sensitivity to visible light such as a CCD or a C-MOS and an imaging optical system that forms an image of a region to be imaged on the two-dimensional detector. The camera 2 is mounted in such a way as to be oriented in the front direction of the vehicle 10, for example, in a vehicle interior of the vehicle 10. The camera 2 captures a region ahead of the vehicle 10 at every predetermined capturing periods (e.g., 1/30 seconds to 1/10 seconds), and generates an image in which the region ahead is captured. The image acquired by the camera 2 may be a color image or a gray image. Note that a plurality of cameras having different capturing directions or different focal distances may be provided in the vehicle 10.

Every time the camera 2 generates an image, the camera 2 outputs the generated image to the ECU 3 via the in-vehicle network 4.

The ECU 3 controls the vehicle 10. In the present embodiment, the ECU 3 controls the vehicle 10 in such a way that the vehicle 10 performs automated driving on the basis of an object detected from a time-series of images acquired by the camera 2. For this purpose, the ECU 3 includes a communication interface 21, a memory 22, and a processor 23.

The communication interface 21 is one example of a communication unit, and includes an interface circuit for connecting the ECU 3 to the in-vehicle network 4. In other words, the communication interface 21 is connected to the camera 2 via the in-vehicle network 4. Every time the communication interface 21 receives an image from the camera 2, the communication interface 21 passes the received image to the processor 23.

The memory 22 is one example of a storage unit, and includes, for example, a volatile semiconductor memory and a non-volatile semiconductor memory. Note that, when the processor 23 includes a plurality of arithmetic units as described later, the memory 22 may include a dedicated memory circuit for each arithmetic unit. The memory 22 stores various types of data used in the object detection processing executed by the processor 23 of the ECU 3, such as images received from the camera 2, various types of parameters for specifying the classifier used in the object detection processing, and various types of thresholds used in the object detection processing, such as a confidence threshold for each type of an object. Furthermore, the memory 22 stores, for a certain period of time, various types of data generated during the object detection processing, such as an object region in which a detected object is represented in each image acquired during a period in which the object is tracked. Still further, the memory 22 may store information used in traveling control of the vehicle 10, such as map information.

The processor 23 is one example of a control unit, and includes one or a plurality of central processing units (CPUs) and a peripheral circuit thereof. The processor 23 may further include another arithmetic circuit such as a logical arithmetic unit, a numerical arithmetic unit, or a graphic processing unit. Every time the processor 23 receives an image from the camera 2 while the vehicle 10 is traveling, the processor 23 executes vehicle control processing including the object detection processing on the received image. Then, the processor 23 controls the vehicle 10 in such a way that the vehicle 10 is automatically driven on the basis of an object detected around the vehicle 10.

Figure 3:
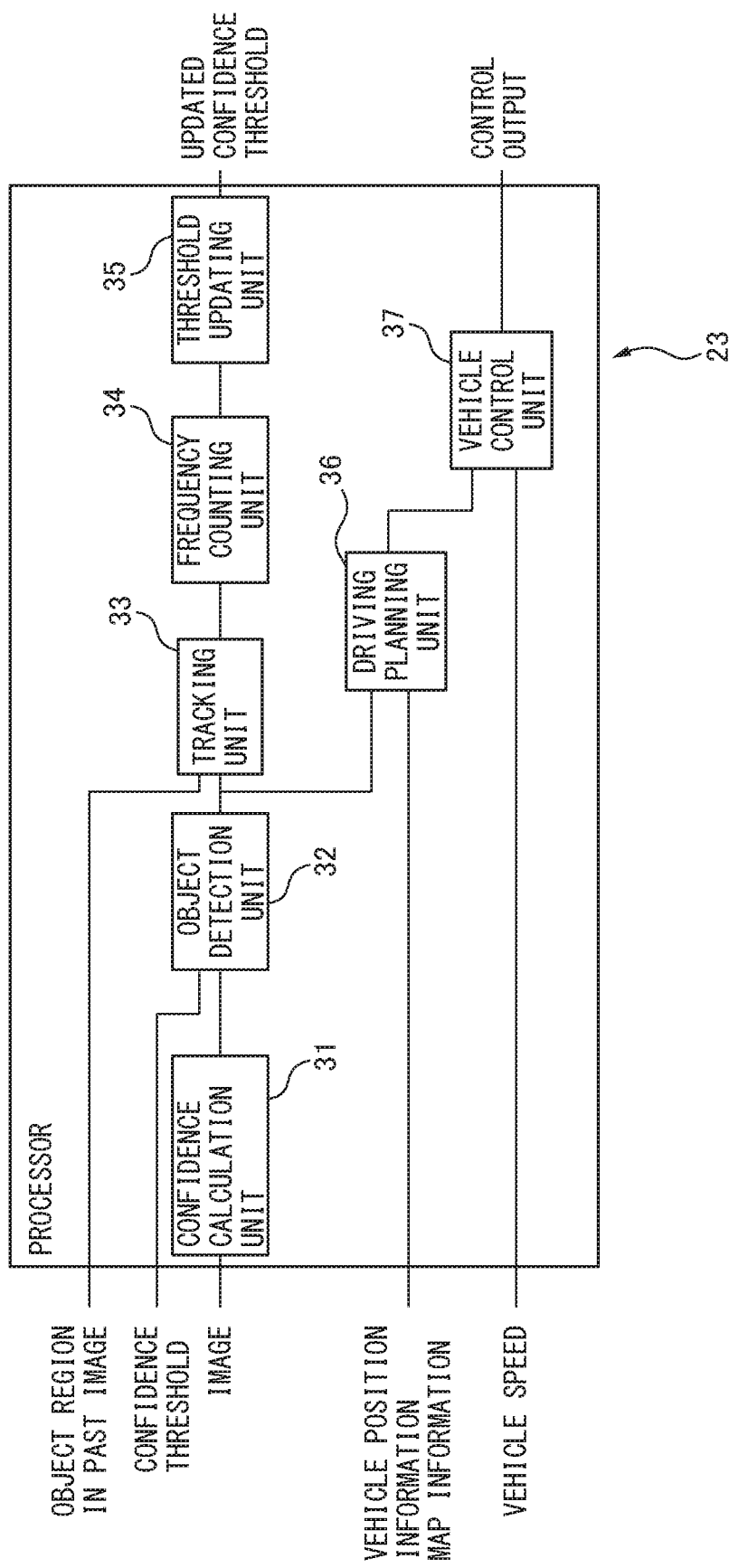
FIG. 3 is a functional block diagram of a processor of the electronic control unit relating to vehicle control processing including object detection processing according to the first embodiment.

FIG. 3 is a functional block diagram of the processor 23 of the ECU 3 relating to the vehicle control processing including the object detection processing according to the first embodiment. The processor 23 includes a confidence calculation unit 31, an object detection unit 32, a tracking unit 33, a frequency counting unit 34, a threshold updating unit 35, a driving planning unit 36, and a vehicle control unit 37. Each of the units included in the processor 23 is, for example, a function module achieved by a computer program executed on the processor 23. Alternatively, each of the units included in the processor 23 may be a dedicated arithmetic circuit provided in the processor 23. Further, among each of the units included in the processor 23, the confidence calculation unit 31, the object detection unit 32, the tracking unit 33, the frequency counting unit 34, and the threshold updating unit 35 execute the object detection processing. Note that, when a plurality of cameras are provided in the vehicle 10, the processor 23 may execute the object detection processing on the basis of an image acquired by each of the cameras.

Every time the confidence calculation unit 31 receives an image from the camera 2, the confidence calculation unit 31 calculates, by inputting the received newest image to a classifier, for each of a plurality of regions on the image and each type of the object to be detected, a confidence score indicating a degree of certainty that the type of the object is represented in the region.

In the present embodiment, the confidence calculation unit 31 uses, as a classifier, a DNN that has been trained in advance in such a way as to calculate, for each of the plurality of regions on the image, the confidence score for each type of object to be detected. The DNN used by the confidence calculation unit 31 may have a structure similar to that of a Single Shot MultiBox Detector (SSD) described in NPL 1 or Faster R-CNN described in NPL 2.

Figure 4:
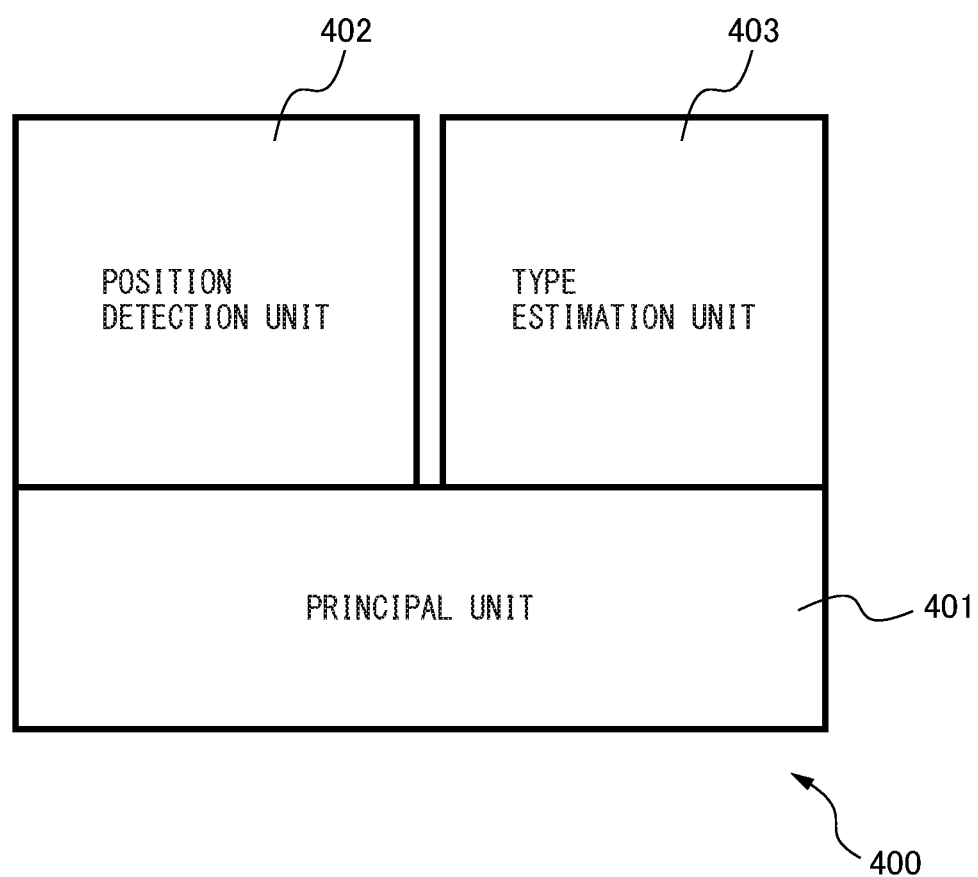
FIG. 4 is a diagram illustrating one example of a configuration of a DNN used as a classifier.

FIG. 4 is a diagram illustrating one example of a configuration of the DNN used as the classifier. A DNN 400 includes a principal unit 401 provided on an input side to which an image is input, and a position detection unit 402 and a type estimation unit 403, which are provided on an output side relative to the principal unit 401. The position detection unit 402 outputs, on the basis of an output from the principal unit 401, a rectangle circumscribed to a region in which the object to be detected is represented on the image. The type estimation unit 403 calculates, on the basis of the output from the principal unit 401, the confidence score for each type of the object represented in the region detected by the position detection unit 402. Note that the position detection unit 402 and the type estimation unit 403 may be integrally formed.

The principal unit 401 may be, for example, a convolutional neural network (CNN) that includes a plurality of layers being serially connected from the input side toward the output side. The plurality of layers include two or more convolutional layers. In addition, the plurality of layers included in the principal unit 401 may include a pooling layer provided for every one or more convolutional layers. Furthermore, the plurality of layers included in the principal unit 401 may include one or more fully connected layers. For example, the principal unit 401 may have a configuration similar to that of a base layer of the SSD. In this case, similarly to VGG-16, the principal unit 401 may be configured in the sequence from the input side, two convolutional layers, a pooling layer that executes MaxPooling (i.e., outputting a maximum value of n×n inputs) (hereinafter, referred to simply as a pooling layer), two convolutional layers, a pooling layer, three convolutional layers, a pooling layer, three convolutional layers, a pooling layer, three convolutional layers, a pooling layer, and three fully connected layers. Alternatively, the principal unit 401 may be configured according to other CNN architectures such as VGG-19, AlexNet, or Network-In-Network.

When an image is input, the principal unit 401 executes a calculation in each layer with respect to the image and outputs a feature map calculated from the image.

To each of the position detection unit 402 and the type estimation unit 403, the feature map output from the principal unit 401 is input. The position detection unit 402 and the type estimation unit 403 may be individually, for example, a CNN that includes a plurality of layers being serially connected from the input side toward the output side. In each of the position detection unit 402 and the type estimation unit 403, the plurality of layers included in the CNN include two or more convolutional layers. In addition, in each of the position detection unit 402 and the type estimation unit 403, the plurality of layers included in the CNN may include a pooling layer provided for every one or more convolutional layers. Note that the convolutional layers and the pooling layer included in the CNN may be common among the position detection unit 402 and the type estimation unit 403. Furthermore, in each of the position detection unit 402 and the type estimation unit 403, the plurality of layers may include one or more fully connected layers. In this case, the fully connected layer is preferably provided on the output side relative to each convolutional layer. In addition, an output from each convolutional layer may be directly input to the fully connected layer. An output layer of the type estimation unit 403 may be a softmax layer that calculates a confidence score for each type of an object to be detected in accordance with a softmax function, or a sigmoid layer that calculates a confidence score for each type of an object to be detected in accordance with a sigmoid function.

For example, the position detection unit 402 and the type estimation unit 403 have been trained in such a way as to output the confidence score for each type of object to be detected, with respect to every region of various positions, various sizes, and various aspect ratios on the image. Therefore, when an image is input, a classifier 400 outputs the confidence score for each type of object to be detected with respect to every region of various positions, various sizes, and various aspect ratios on the image.

The image (teacher image) included in teacher data used to train the classifier 400 is tagged with, for example, a type (e.g., a car, a human being, a road sign, a traffic light, other object on the road, or the like) of the object to be detected and a rectangle circumscribed to the object to be detected, which indicates the region in which the object is represented.

The classifier 400 has been trained by using multiple teacher images as described above according to a learning method such as a backpropagation method. The processor 23 can detect in an image, by using the classifier 400 that has been trained in such a manner, an object to be detected with a high degree of accuracy.

The confidence calculation unit 31 registers a position and a bound of each region on the image and the confidence score for each type of object calculated with respect to the region in a detection object candidates list, which is a list of candidates for the objects to be detected. The confidence calculation unit 31 then outputs the detection object candidates list to the object detection unit 32.

With reference to the detection object candidates list, the object detection unit 32 compares, for each of a plurality of regions having a confidence score calculated in the newest image acquired by the camera 2, the confidence score for each type of an object calculated for the region with a confidence threshold set for the type. The object detection unit 32 then detects, as the object region in which the object to be detected is represented, a region of the plurality of regions with respect to which the confidence score for any type of the object is equal to or higher than the confidence threshold applied to the type. Furthermore, the object detection unit 32 estimates, as the type of the object represented in the object region, the type of the object whose confidence score being equal to or higher than the confidence threshold in the object region.

Note that, when there is a tracked object in a previous image and a confidence threshold for any type related to the tracked object is updated by the threshold updating unit 35, the object detection unit 32 calculates an estimated position of the tracked object in the newest image. When a confidence score calculated for the type is equal to or higher than the updated confidence threshold for a region included in a predetermined range including the estimated position, the object detection unit 32 then detects the region as the object region in which the object of the type is represented.

In relation to the estimation of the position of the tracked object in the newest image, the object detection unit 32 applies a prediction filter such as the Kalman filter, a particle filter, or a linear prediction filter to the region in which the object is represented in each of a plurality of past images acquired during tracking, for example. In this way, the object detection unit 32 can calculate the region estimated that the object is represented, which includes the estimated position of the object in the newest image. For example, the object detection unit 32 then sets, as a region to which the confidence threshold updated in relation to the tracked object is applied, the estimated region or a region acquired by expanding the estimated region by a predetermined pixel number in at least one of a horizontal direction and a vertical direction.

The object detection unit 32 registers a position and a bound of each of the object regions on the image and the type of the object estimated with respect to the object region in a detected objects list, which is a list of detected objects. The object detection unit 32 then stores the detected objects list in the memory 22.

The tracking unit 33 tracks, for each object region detected from the newest image, the object represented in the object region by associating the object with an object detected from a past image. Note that, in the present embodiment, since there is a possibility that the same object is estimated, by mistake, to be an object of different types in a time-series of images by the object detection unit 32, it is preferable that the tracking unit 33 does not use a type of an object estimated by the object detection unit 32 during the object tracking.

In view of this, the tracking unit 33 tracks, by applying tracking processing on the basis of an optical flow, for example, the Lucas-Kanade method, to an object region of interest in the newest image and an object region in a past image, an object represented in the object regions. For this purpose, for example, the tracking unit 33 extracts, by applying a filter for feature point extraction such as SIFT or a Harris operator to the object region of interest, a plurality of feature points from the object region. Then, the tracking unit 33 may calculate the optical flow by specifying a related point in the object region in the past image for each of the plurality of feature points in accordance with the applied tracking method. Alternatively, the tracking unit 33 may track, by applying other tracking method, which is applied to tracking of a moving object detected from an image, to the object region of interest in the newest image and the object region in the past image, an object represented in the object regions.

With reference to an object detection list in each of the time-series of images acquired during a period in which, among the objects detected from the newest image, the object associated with the object represented in the past image, i.e., the tracked object can be tracked (hereinafter, referred to simply as a tracking period), the tracking unit 33 specifies a type of the object estimated by the object detection unit 32 in each of the time-series of images. The tracking unit 33 then informs the frequency counting unit 34 of the estimated type of the object in each of the images during the tracking period. Furthermore, the tracking unit 33 stores, in the memory 22, information indicating a position of the object region in which the tracked object is represented in each of the images during the tracking period so that the object detection unit 32 can calculate an estimated position of the tracked object in an image acquired next time and later.

When the tracking period of the tracked object reaches a certain period of time, the frequency counting unit 34 counts a frequency of occurrence for each type of the object estimated by the object detection unit 32 on the basis of the estimated type of the object in each of the images during the tracking period, which is informed from the tracking unit 33. The frequency counting unit 34 informs the threshold updating unit 35 of the frequency of occurrence for each type of the object estimated by the object detection unit 32 during the tracking period for the tracked object.

The threshold updating unit 35 updates, for each type of the object estimated by the object detection unit 32 during the tracking period for the tracked object, the confidence threshold applied to the type of the object based on the frequency of occurrence for each type of the object.

In relation to the tracked object, a type having a higher frequency of occurrence is more likely to be a true type of the object. In view of this, the threshold updating unit 35 updates a confidence threshold of at least any of types estimated for the tracked object (i.e., types whose frequency of occurrence is 1 or more) in such a way that a confidence threshold applied to a type of the object having a high frequency of occurrence is relatively lower than a confidence threshold applied to a type of the object having a low frequency of occurrence. For example, the threshold updating unit 35 reduces a confidence threshold applied to a type having the highest frequency of occurrence for the tracked object. Alternatively, the threshold updating unit 35 may increase a confidence threshold applied to a type other than the type having the highest frequency of occurrence among types estimated for the tracked object. Alternatively, the threshold updating unit 35 may reduce the confidence threshold applied to the type having the highest frequency of occurrence for the tracked object, whereas increase the confidence threshold applied to the type other than the type having the highest frequency of occurrence. In this way, in relation to the tracked object, a type having a higher frequency of occurrence is more easily detected as the type of the tracked object in an image acquired subsequently.

Figure 5:
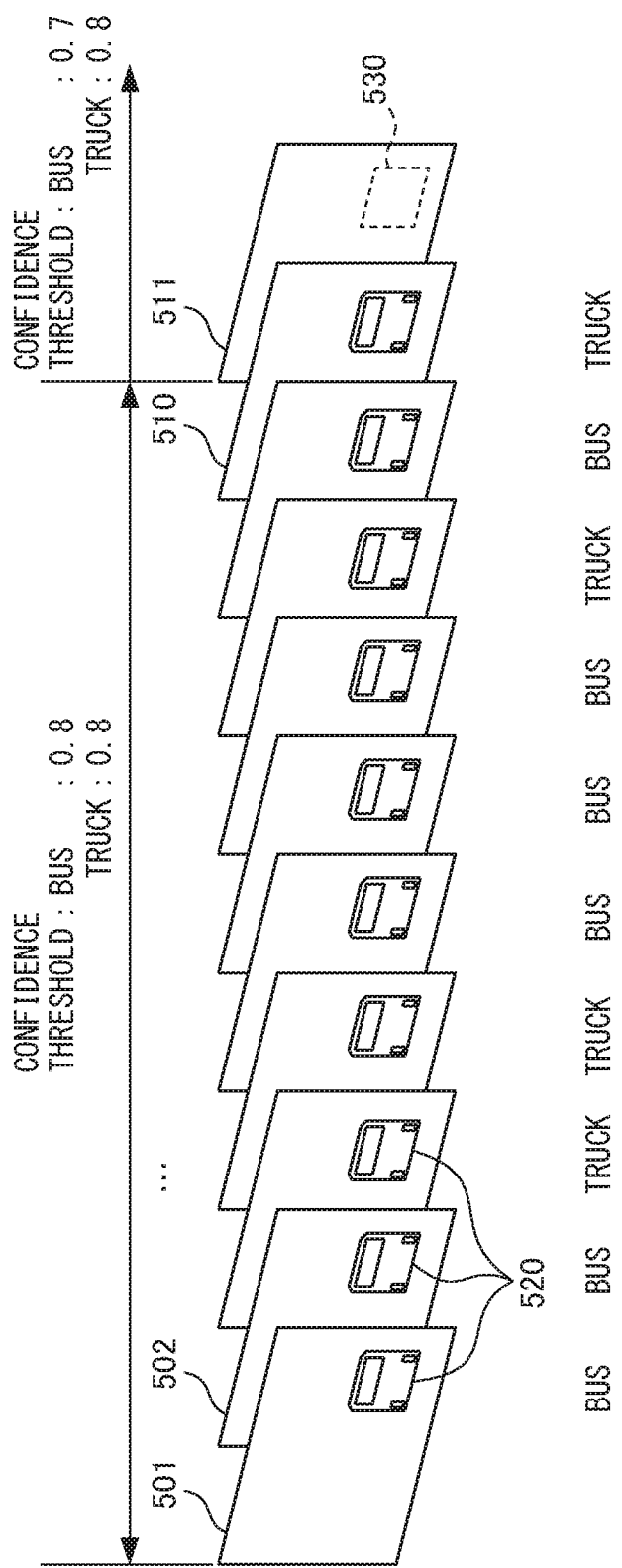
FIG. 5 is a diagram illustrating one example of tracking of a detected object and an update of a confidence threshold.

FIG. 5 is a diagram illustrating one example of tracking of a detected object and an update of a confidence threshold. In the example illustrated in FIG. 5, an object 520 is detected from each of a time-series of images 501 to 510 and is tracked. Further, it is assumed that a confidence threshold applied to each type of an object to be detected in the images 501 to 510 is 0.8. Then, a type of the tracked object 520 is estimated to be "bus", "bus", "truck", "truck", "bus", "bus", "bus", "truck", "bus", and "truck" in order from the oldest image 501. In this case, for the object 520, a frequency of occurrence of "bus" is counted as 6 and a frequency of occurrence of "truck" is counted as 4 by the frequency counting unit 34. Therefore, the frequency of occurrence of "bus" is higher than the frequency of occurrence of "truck". In view of this, the threshold updating unit 35 reduces, for example, the confidence threshold applied to the type "bus" of the object from 0.8 to 0.7 in a region in a predetermined range 530 including an estimated position of the object 520 on an image 511 acquired after the image 510. In this way, the confidence threshold applied to the type "bus" of the object is lower than the confidence threshold applied to the type "truck" of the object.

The threshold updating unit 35 associates the updated confidence threshold and the related type of the object with the related tracked object. Specifically, for example, the threshold updating unit 35 stores, in the memory 22, the updated confidence threshold and the related type of the tracked object in association with a position of the object region in which the tracked object is represented in each of images in the tracking period of the tracked object.

Note that the threshold updating unit 35 may subsequently stop updating the confidence threshold during a certain period of time for the tracked object whose confidence threshold for any of types is updated once.

The driving planning unit 36 generates, with reference to the detected objects list generated for each image, one or more trajectories to be traveled of the vehicle 10 in such a way that the object existing around the vehicle 10 and the vehicle 10 do not collide. The trajectory to be traveled is represented as, for example, a set of target positions for the vehicle 10 at each of times from the current time to a certain time later. For example, every time the driving planning unit 36 receives the object detection list from the object detection unit 32, the driving planning unit 36 transforms, by executing viewing transformation processing using information on the camera 2 such as a mounting position of the camera 2 in the vehicle 10, coordinates in the image of the object in the object detection list into coordinates in the bird's eye image (bird's eye coordinates). The driving planning unit 36 then tracks, by executing tracking processing on a series of bird's eye coordinates using the Kalman filter, a particle filter, or the like, the objects registered in the detected objects list, and estimates, on the basis of the path calculated from a tracking result, a predicted path for each object up to a certain time later. The driving planning unit 36 generates, on the basis of the predicted path for each tracked object and a position, a speed, and an orientation of the vehicle 10, a trajectory to be traveled for the vehicle 10 in such a way that, for each tracked object, an predicted value of the distance between the tracked object and the vehicle 10 is equal to or higher than a certain distance until a certain time later. Note that the driving planning unit 36 can estimate the position, the speed, and the orientation of the vehicle 10, for example, on the basis of current position information indicating a current position of the vehicle 10 acquired from a GPS receiver (not illustrated) installed in the vehicle 10. Alternatively, the position, the speed, and the orientation of the vehicle 10 may be estimated by detecting, every time an image is acquired by the camera 2, left and right division lines of the vehicle 10 from the image by a localization processing unit (not illustrated), and matching the detected lane division lines with map information stored in the memory 22. Furthermore, the driving planning unit 36 may confirm, with reference to, for example, the current position information of the vehicle 10 and the map information stored in the memory 22, the number of lanes in which the vehicle 10 can travel. When there are a plurality of lanes in which the vehicle 10 can travel, the driving planning unit 36 may generate a trajectory to be traveled in such a way as to change the lane in which the vehicle 10 travels. Note that the driving planning unit 36 may generate a plurality of trajectories to be traveled. In this case, the driving planning unit 36 may select a trajectory among the plurality of trajectories to be traveled in such a way that the sum of absolute values of accelerations of the vehicle 10 is minimum.

The driving planning unit 36 informs the vehicle control unit 37 of the generated trajectory to be traveled.

The vehicle control unit 37 controls each unit of the vehicle 10 in such a way that the vehicle 10 travels along the informed trajectory to be traveled. For example, the vehicle control unit 37 calculates an acceleration of the vehicle 10 in accordance with the informed trajectory to be traveled and a current vehicle speed of the vehicle 10 measured by a vehicle speed sensor (not illustrated), and sets an accelerator opening degree or an amount of braking in such a way as to achieve the calculated acceleration. The vehicle control unit 37 then calculates an amount of fuel injection in accordance with the set accelerator opening degree, and outputs a control signal related to the amount of fuel injection to a fuel injection device of an engine of the vehicle 10. Alternatively, the vehicle control unit 37 outputs a control signal related to the set amount of braking to a brake of the vehicle 10.

Furthermore, the vehicle control unit 37 calculates, when the vehicle 10 changes its course in order to travel along the trajectory to be traveled, a steering angle for the vehicle 10 in accordance with the trajectory to be traveled, and outputs a control signal related to the calculated steering angle to an actuator that controls a steering wheel of the vehicle 10 (not illustrated).

Figure 6:
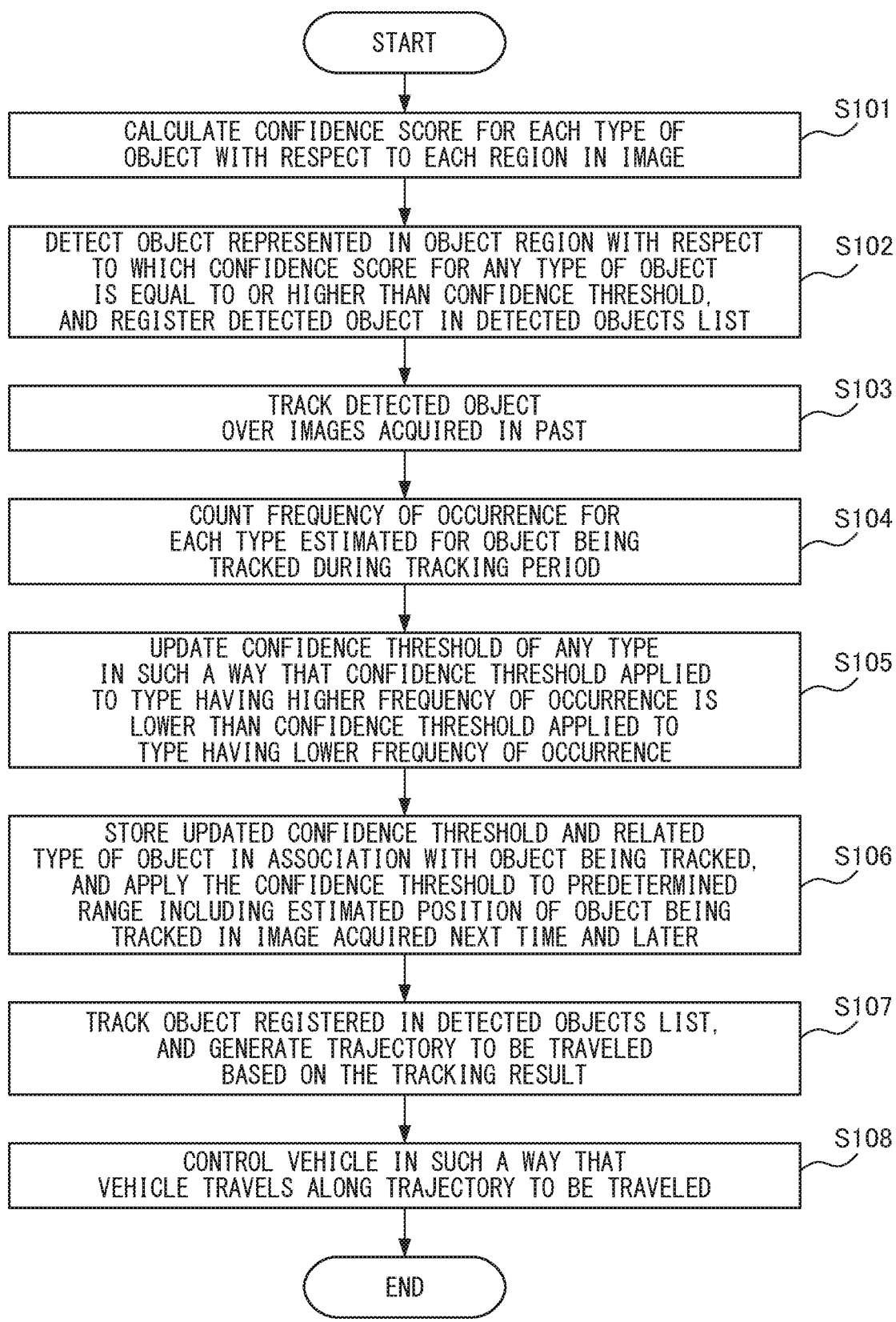
FIG. 6 is an operation flowchart of the vehicle control processing including the object detection processing according to the first embodiment.

FIG. 6 is an operation flowchart of the vehicle control processing including the object detection processing executed by the processor 23 according to the first embodiment. Every time the processor 23 receives an image from the camera 2, the processor 23 executes the vehicle control processing in accordance with the operation flowchart illustrated in FIG. 6. Note that, in the operation flowchart illustrated below, processing steps from step S101 to step S106 correspond to the object detection processing.

The confidence calculation unit 31 of the processor 23 inputs the newest image acquired by the camera 2 to the classifier to calculate, with respect to various regions in the image, a confidence score for each type of object to be detected represented in the region (step S101).

In addition, the object detection unit 32 of the processor 23 determines that, in an object region with respect to which the confidence score for any type of the object is equal to or higher than the confidence threshold for the type among of the plurality of regions to which the confidence score is calculated in the newest image acquired by the camera 2, the object of the type is detected (step S102). The object detection unit 32 then registers the detected object in the detected objects list. Note that, when there is a tracked object in a previous image and a confidence threshold for any type related to the tracked object is updated, the object detection unit 32 uses the updated confidence threshold for a comparison with the confidence score for a region in a predetermined range including an estimated position of the tracked object.

The tracking unit 33 of the processor 23 tracks, for each object region in which the object is represented in the newest image, the object represented in the object region in the newest image on the basis of the object region in the newest image and an object region in a past image (step S103). The frequency counting unit 34 of the processor 23 then counts, for the object that can be tracked for a certain period of time or longer, a frequency of occurrence for each type of the object estimated by the object detection unit 32 during the tracking period (step S104).

The threshold updating unit 35 of the processor 23 updates the confidence threshold of at least any of types estimated for the tracked object in such a way that, for the tracked object, a confidence threshold applied to a type of the object having a high frequency of occurrence becomes relatively lower than a confidence threshold applied to a type of the object having a low frequency of occurrence (step S105). The threshold updating unit 35 then stores, in the memory 22, the updated confidence threshold and the corresponding type of the object in association with the tracked object, and applies the updated confidence threshold to the region in the predetermined range including the estimated position of the tracked object in an image acquired next time and later (step S106).

The driving planning unit 36 of the processor 23 tracks the object registered in the detected objects list with reference to the detected objects list, and generates a trajectory to be traveled of the vehicle 10 in such a way that the trajectory to be traveled is at a predetermined distance or more from a predicted path of the object being estimated on the basis of the tracking result (step S107). The vehicle control unit 37 of the processor 23 then controls the vehicle 10 in such a way that the vehicle 10 travels along the trajectory to be traveled (step S108). Then, the processor 23 ends the vehicle control processing.

As described above, the object detection device calculates a frequency of occurrence for each type of an object that is detected from images acquired in time-series by using the classifier and is tracked, on the basis of an estimated result of the type of the tracked object. The object detection device updates a confidence threshold of any type in such a way that a confidence threshold of a type having a high frequency of occurrence is relatively lower than a confidence threshold of a type having a low frequency of occurrence. The object detection device then applies the updated confidence threshold to a region in a predetermined range including an estimated position of the object in an image acquired subsequently. Thus, the object detection device can easily determine that the type of the object continuing to be tracked is the type having the high frequency of occurrence. Further, it is not need to train the classifier used by the object detection device by using data in time-series for suppressing false recognition of a type of an object to be detected. Thus, the object detection device can improve estimation accuracy of a type of an object to be detected while suppressing an increase in an amount of calculation and a training man-hour by the classifier.

Note that, according to a modification example, the threshold updating unit 35 may update a confidence threshold as described above only when there is a predetermined similarity relationship between a plurality of types estimated for a tracked object (i.e., types whose frequency of occurrence is 1 or more). The predetermined similarity relationship is previously set, for example, and a similarity reference table representing the similarity relationship is previously stored in the memory 22. The threshold updating unit 35 determines, with reference to the similarity reference table, whether the similarity relationship is set between the plurality of types whose frequency of occurrence is 1 or more for the tracked object. When the similarity relationship is set, the threshold updating unit 35 may update the confidence threshold of the type of the object to which the similarity relationship is set, similarly to the embodiment described above. For example, the similarity relationship described above may be stored in the memory 22, as table information representing a mapping relationship between identification numbers (IDs) representing a type of an object, and the threshold updating unit 35 may determine, by searching the table information, whether there is the predetermined similarity relationship between a plurality of types estimated for a tracked object.

For example, the similarity relationship is set between types of an object having a common feature in terms of an appearance. For example, "two-wheeled vehicle" being one of types of an object having a confidence score calculated by the confidence calculation unit 31 and "pedestrian" being the other type of the object both include a common feature in terms of an appearance, which is a human being. Thus, the two types of "two-wheeled vehicle" and "pedestrian" are set to have the similarity relationship therebetween. Similarly, "emergency vehicle (four or more-wheeled vehicle)" being one of types of an object having a confidence score calculated by the confidence calculation unit 31 and "emergency vehicle (two-wheeled vehicle)" being the other type of the object both include a common feature in terms of an appearance, which is a rotating light whose appearance that may vary over time. Thus, the two types of "emergency vehicle (four or more-wheeled vehicle)" and "emergency vehicle (two-wheeled vehicle)" are set to have the similarity relationship therebetween.

Alternatively, it may be set that there is the similarity relationship between types determined to belong to the same class by executing clustering processing on a feature amount extracted from a region in which an object to be detected is represented for each type of the object. In this case, the feature amount used for determining the similarity relationship can be a feature amount usable for determining a type of an object, such as a Haar-like feature, histograms of oriented gradients (HOG), or a feature map calculated by the classifier used for calculating a confidence score by the confidence calculation unit 31, for example.

According to the modification example, the threshold updating unit 35 updates a confidence threshold only when there is the similarity relationship between types estimated for a tracked object, thereby mistakenly updating of the confidence threshold when two or more objects of different types are captured in close vicinity to each other on an image is suppressed. As a result, the object detection device can suppress an increase in false detection of an object.

According to another modification example, when, for a tracked object, an object of a type having a maximum frequency of occurrence is an object of a type having an appearance feature that varies over time (e.g., "emergency vehicle (four or more-wheeled vehicle)" or "emergency vehicle (two-wheeled vehicle)"), the threshold updating unit 35 may further reduce a confidence threshold to be lower than the confidence threshold of the type having the maximum frequency of occurrence in the embodiment described above. In this way, the object detection device can further improve the estimation accuracy of the type of the object having the appearance feature that varies over time.

According to still another modification example, when there is a tracked object in a previous image and a confidence threshold for any type related to the tracked object is updated, the object detection unit 32 may apply the updated confidence threshold to each past image acquired during the tracking period of the tracked object and execute detection of the object again. The object detection unit 32 may then calculate an estimated position of the tracked object in the newest image on the basis of the object detection result being executed again. In this way, the object detection unit 32 can more appropriately set a predetermined range on the image to which the updated confidence threshold is applied.

Next, an object detection device according to a second embodiment will be described. When two or more different types during tracking are estimated for a tracked object over a time-series of images, the object detection device according to the second embodiment updates a class to which NMS processing is applied in such a way that the two or more different types are included in the same class for a predetermined range including an estimated position of the object in an image acquired subsequently.

Figure 7:
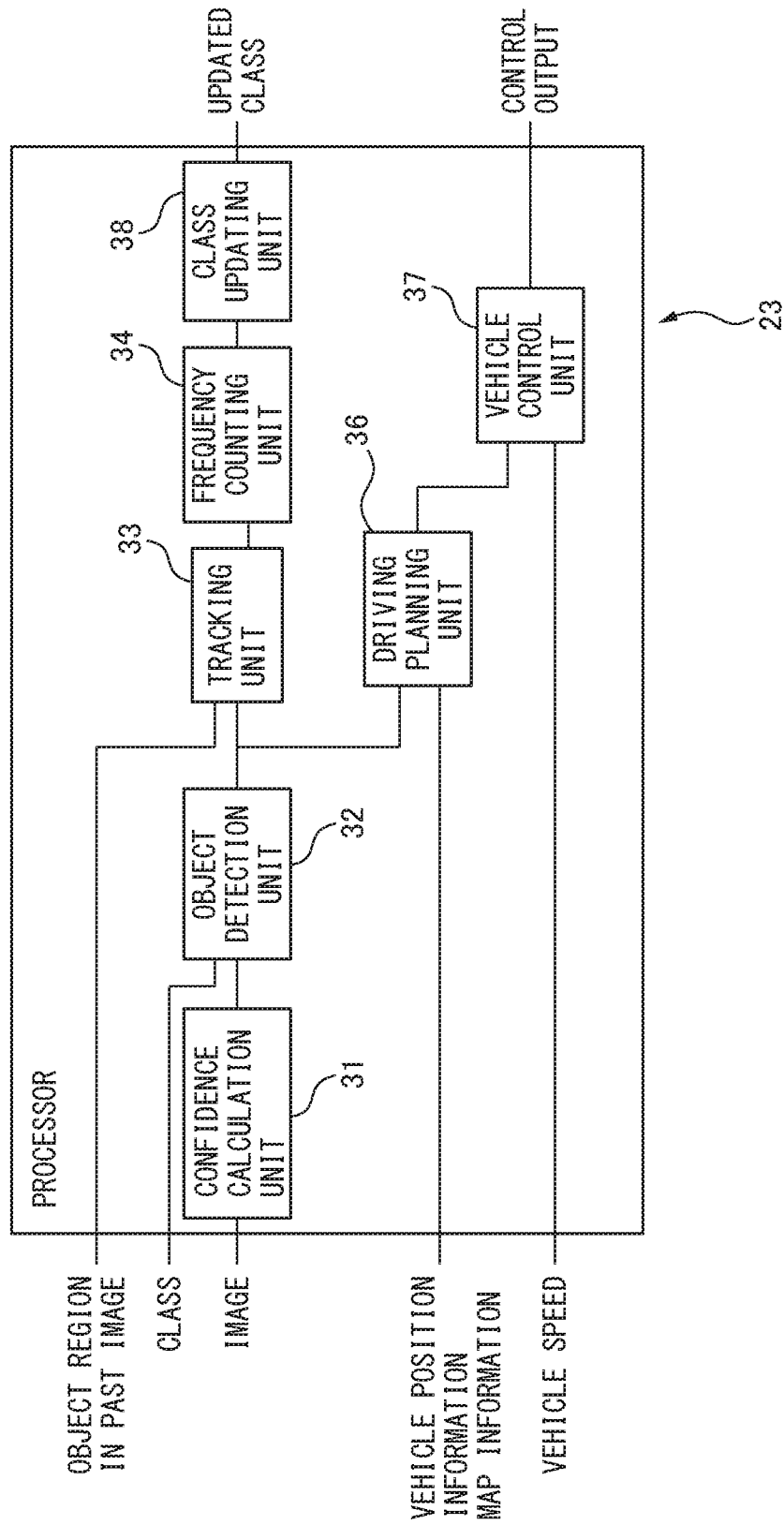
FIG. 7 is a functional block diagram of a processor of an electronic control unit relating to vehicle control processing including object detection processing according to a second embodiment.

FIG. 7 is a functional block diagram of a processor 23 of an ECU 3 relating to vehicle control processing including object detection processing according to the second embodiment. The processor 23 includes a confidence calculation unit 31, an object detection unit 32, a tracking unit 33, a frequency counting unit 34, a class updating unit 38, a driving planning unit 36, and a vehicle control unit 37. Each of the units included in the processor 23 is, for example, a function module achieved by a computer program executed on the processor 23. Alternatively, each of the units included in the processor 23 may be a dedicated arithmetic circuit provided in the processor 23. The processor 23 of the object detection device according to the second embodiment is different from the processor according to the first embodiment illustrated in FIG. 3 in that the class updating unit 38 is provided instead of the threshold updating unit 35 and in a part of processing of the object detection device 32. Thus, hereinafter, a difference and a related portion thereof will be described. Another elements of the object detection device may be referred to the description of the corresponding component in the first embodiment.

Similarly to the first embodiment, the object detection unit 32 compares, for each of a plurality of regions having a confidence score calculated in the newest image acquired by a camera 2, the confidence score for each type of an object calculated for the region with a confidence threshold set for the type. The object detection unit 32 then detects, as the object region in which the object of the type is represented, a region of the plurality of regions with respect to which the confidence score for any type of the object is equal to or higher than the confidence threshold applied to the type.

Furthermore, in the present embodiment, the object detection unit 32 executes the NMS processing on a region in which the object of the type belonging to a class to which the NMS processing is applied is represented. In other words, in a region in which a confidence score is maximum of two or more regions in which any confidence score of types belonging to the same class is equal to or higher than a confidence threshold of the type and a degree of overlapping between each other is equal to or higher than a predetermined overlapping threshold (e.g., 0.3 to 0.7) among a plurality of regions in the newest image, the object detection unit 32 detects the object of the type corresponding to the maximum confidence score.

The object detection unit 32 calculates, as a degree of overlapping between two regions of interest, a ratio of an area of overlapping regions between the two regions of interest to an area of a union of the two regions of interest (i.e., intersection over union, IoU). Alternatively, the object detection unit 32 may calculate, as the degree of overlapping between the two regions of interest, a ratio of an area of overlapping regions between the two regions of interest to an area of one of the two regions of interest, instead of calculating the IoU. In this case, one of the two regions of interest can be, for example, the one having a greater area of the two regions.

Further, a plurality of classes are previously set by levels according to an execution level of the NMS processing, for example. Then, a class related to the lowest execution level among the classes is set as a class to which the NMS processing is actually applied. Subsequently, the class to which the NMS processing is applied may be updated by the class updating unit 38 according to a type estimated for a tracked object. Note that the execution level of the NMS processing and each class are set in such a way as to increase similarity of an appearance between types belonging to a class at a lower execution level of the NMS processing.

Figure 8:
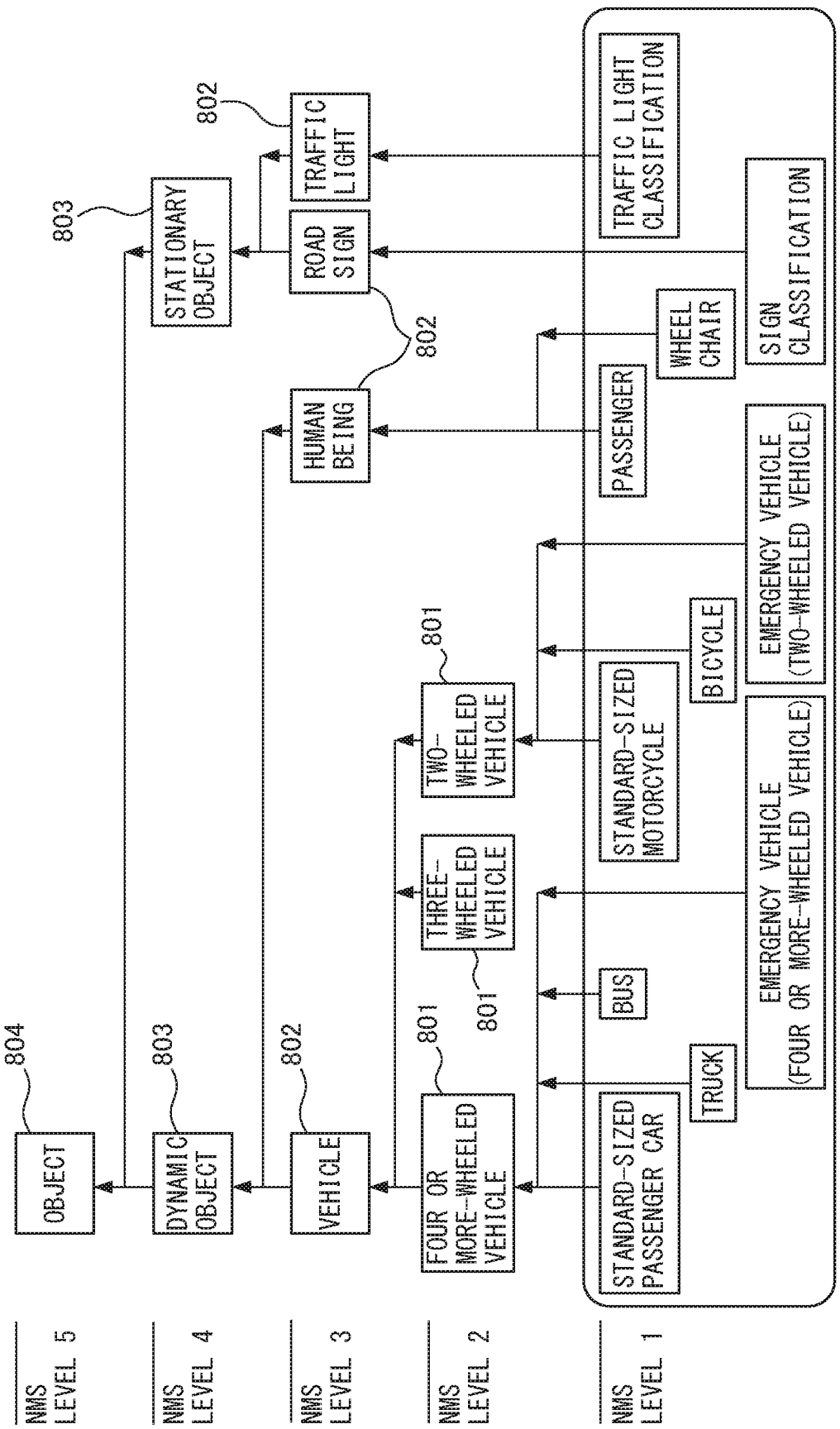
FIG. 8 is a diagram illustrating one example of an execution level of NMS processing set by levels.

FIG. 8 is a diagram illustrating one example of an execution level of the NMS processing set by levels (hereinafter, referred to simply as an NMS level). In this example, an NMS level 1 to an NMS level 5 in five stages are set. Then, at the lowest NMS level 1, the NMS processing is executed only when types of objects represented in respective two regions having a degree of overlapping equal to or higher than an overlapping threshold are the same.

Further, three classes of "four or more-wheeled vehicle", "three-wheeled vehicle", and "two-wheeled vehicle" are set as a class 801 corresponding to a second lowest NMS level 2. Types of "standard-sized passenger car", "truck", "bus", and "emergency vehicle (four or more-wheeled vehicle)" among types of objects having a confidence score calculated in the confidence calculation unit 31 are included in the class of "four or more-wheeled vehicle" of the class 801. Further, types of "standard-sized motorcycle", "bicycle", and "emergency vehicle (two-wheeled vehicle)" among the types of the objects having the confidence score calculated in the confidence calculation unit 31 are included in the class of "two-wheeled vehicle".

Further, classes of four types of "vehicle", "human being", "road sign", and "traffic light" are set as a class 802 corresponding to a third lowest NMS level 3. "Four or more-wheeled vehicle", "three-wheeled vehicle", and "two-wheeled vehicle" that are one lower classes are included in the class of "vehicle" of the class 802. Further, types of "passenger" and "wheelchair" (i.e., human being captured in image together with wheelchair) among the types of the objects having the confidence score calculated in the confidence calculation unit 31 are included in the class of "human being". Furthermore, a type corresponding to an individual classification of road signs among the types of the objects having the confidence score calculated in the confidence calculation unit 31 is included in the class of "road sign". Still further, a type corresponding to an individual classification of traffic lights among the types of the objects having the confidence score calculated in the confidence calculation unit 31 is included in the class of "traffic light".

Furthermore, two classes of "dynamic object" and "stationary object" are set as a class 803 corresponding to a second highest NMS level 4. "Vehicle" and "human being" that are one lower classes are included in the class of "dynamic object" of the class 803. Further, "road sign" and "traffic light" that are one lower classes are included in the class of "stationary object". Then, one class of "object" is set as a class 804 corresponding to the highest NMS level 5. "Dynamic object" and "stationary object" that are one lower classes are included in the class of "object".

Before the class updating unit 38 updates a class to which the NMS processing is applied, the NMS processing is applied to the lowest class for a region in which an object being first detected in the newest image and not detected in a previous image is represented, for example. For example, when objects of the same type "truck" are detected in two respective regions having a degree of overlapping equal to or higher than the overlapping threshold, the NMS processing is applied to the two regions.

Further, when the class updating unit 38 updates a class to which the NMS processing is applied, the NMS processing is applied between regions in which objects of types belonging to the updated class are represented. For example, it is assumed that an application level of the NMS processing for a tracked object is updated to the class of "four or more-wheeled vehicle" at the NMS level 2. Then, for example, when "truck" is detected in one of two regions having a degree of overlapping equal to or higher than the overlapping threshold and "bus" is detected in the other region, both of "truck" and "bus" are included in "four or more-wheeled vehicle" being the class at the NMS level 2, and thus the NMS processing is executed on the two regions. On the other hand, it is assumed that "standard-sized passenger car" is detected in one of two regions having a degree of overlapping equal to or higher than the overlapping threshold and "bicycle" is detected in the other region. In this case, "four or more-wheeled vehicle" being the class to which "standard-sized passenger car" belongs and "two-wheeled vehicle" being the class to which "bicycle" belongs are different. Thus, the NMS processing is not executed on the two regions.

Furthermore, it is assumed that, for example, the application level of the NMS processing for a tracked object is updated to the class of "vehicle" at the NMS level 3, "emergency vehicle (four or more-wheeled vehicle)" is detected in one of two regions having a degree of overlapping equal to or higher than the overlapping threshold, and "emergency vehicle (two-wheeled vehicle)" is detected in the other region. In this case, both of "emergency vehicle (four or more-wheeled vehicle)" and "emergency vehicle (two-wheeled vehicle)" are included in "vehicle" being the class at the NMS level 3, and thus the NMS processing is executed on the two regions.

Note that, when the class updating unit 38 updates a class to which the NMS processing is applied in relation to the tracked object, the object detection unit 32 calculates an estimated position for the tracked object on the newest image similarly to the first embodiment. Then, when at least one of two regions having a degree of overlapping equal to or higher than the overlapping threshold is included in a predetermined range including the estimated position, the object detection unit 32 may execute the NMS processing by using the updated class.

Similarly to the first embodiment, the object detection unit 32 registers a position and a bound of each of the object regions on the image and the type of the object calculated with respect to the region in a detected objects list, which is a list of detected objects. The object detection unit 32 then stores the detected objects list in the memory 22.

Similarly to the first embodiment, the tracking unit 33 associates, for each of one or more object regions detected from the newest image, an object represented in the object region with an object detected from a past image, and thus tracks the object detected from the newest image. Further, similarly to the first embodiment, when the tracking period of the tracked object reaches a certain period of time, the frequency counting unit 34 counts a frequency of occurrence for each type of the object estimated by the object detection unit 32 during the tracking period. Note that the frequency counting unit 34 may use, for counting a frequency of occurrence, only an image related to the tracked object to which the NMS processing is applied among a time-series of images acquired during the tracking period for the tracked object.

Further, when the class updating unit 38 has already updated a class to which the NMS processing is applied for the tracked object, the frequency counting unit 34 may count a total of frequencies of occurrence for types included in a subordinate class (hereinafter, referred to as a sub-class) belonging to the updated class as a frequency of occurrence for the sub-class. For example, in the example illustrated in FIG. 8, it is assumed that the NMS processing is applied to the class of "vehicle" at the NMS level 3 for the tracked object. In this case, the frequency counting unit 34 may count a total of frequencies of occurrence of the types "standard-sized motorcycle", "bicycle", and "emergency vehicle (two-wheeled vehicle)" of the object included in "two-wheeled vehicle" being one sub-class of the class of "vehicle", as a frequency of occurrence of the sub-class "two-wheeled vehicle".

When a frequency of occurrence for each of two or more types of a detected object is equal to or higher than a predetermined frequency threshold in the tracking period of the tracked object, the class updating unit 38 updates a class to which the NMS processing is applied in such a way as to include the two or more types. Further, when a frequency of occurrence is calculated in units of sub-classes, the class updating unit 38 may determine whether or not to update a class to which the NMS processing is applied by comparing the frequency of occurrence of the sub-class with the frequency threshold. The predetermined frequency threshold can be, for example, a value acquired by multiplying the number of a time-series of images acquired during the tracking period by a predetermined coefficient (e.g., 0.1 to 0.3) less than 0.5. Alternatively, the predetermined frequency threshold may be a preset fixed value (e.g., 3 to 10).

FIG. 8 is referred again. For example, it is assumed that, for the tracked object, a frequency of occurrence of the type "standard-sized passenger car" of the object belonging to the class of "four or more-wheeled vehicle" and a frequency of occurrence of the type "bicycle" of the object belonging to the class of "two-wheeled vehicle" are equal to or higher than the frequency threshold. In this case, for the tracked object, the class updating unit 38 updates a class to which the NMS processing is applied for an image acquired next to the class of "vehicle" at the NMS level 3 in such a way as to include both of the types "standard-sized passenger car" and "bicycle" of the object. Further, it is assumed that, for the tracked object, a frequency of occurrence of the type "bicycle" of the object belonging to the class of "two-wheeled vehicle" and a frequency of occurrence of the type "passenger" of the object belonging to the class of "human being" are equal to or higher than the frequency threshold. In this case, for the tracked object, the class updating unit 38 updates a class to which the NMS processing is applied for an image acquired next to the class of "dynamic object" at the NMS level 4 in such a way as to include both of the types "bicycle" and "passenger" of the object. Alternatively, it is assumed that a class to which the NMS processing is applied for the tracked object has been already updated to the class of "vehicle" at the NMS level 3, and a frequency of occurrence of "two-wheeled vehicle" being one sub-class of "vehicle" and a frequency of occurrence of the type "passenger" of the object are equal to or higher than the frequency threshold. In this case, for the tracked object, the class updating unit 38 may update a class to which the NMS processing is applied for an image acquired next to the class of "dynamic object" at the NMS level 4 in such a way as to include both of the sub-class "two-wheeled vehicle" and the type "passenger".

According to another modification example, when two or more types of an object having a frequency of occurrence which is equal to or higher than the predetermined frequency threshold belong to different classes without application of the NMS processing for the types in the tracking period of the tracked object, a new class including the two or more types of the object may be set. Then, the object detection unit 32 may execute, in accordance with the newly set class, the NMS processing on a region in a predetermined range including an estimated position of the tracked object in an image acquired next. For example, it is assumed that, for the tracked object, a frequency of occurrence of the type "bicycle" of the object belonging to the class of "two-wheeled vehicle" and a frequency of occurrence of the type "passenger" of the object belonging to the class of "human being" are equal to or higher than the frequency threshold. It is also assumed that, for the tracked object, the NMS processing is applied to types of the object belonging to the class of "two-wheeled vehicle" or types of the object belonging to the class of "human being" at the time of acquiring the newest image, and the NMS processing is not applied to the class of "dynamic object". In this case, the class updating unit 38 may set a new class including the type "bicycle" and the type "passenger". Then, the object detection unit 32 may apply the NMS processing when the types of the object represented in respective two regions are "bicycle" and "passenger" and the two regions are included in a predetermined range including the estimated position of the tracked object in an image acquired next for the tracked object and have a degree of overlapping which is equal to or higher than the overlapping threshold.

Further, according to anther modification example, when there is only one type of an object having a frequency of occurrence which is equal to or higher than 1 for the tracked object, the class updating unit 38 may update a class to which the NMS processing is applied to a class in such a way as to have a lower NMS level and include the type.

Note that the class updating unit 38 may subsequently stop updating a class during a certain period of time for the tracked object whose class to which the NMS processing is applied is updated once.

The class updating unit 38 associates the updated class with a corresponding tracked object. Specifically, the class updating unit 38 stores, in the memory 22, identification information of the updated class in association with a position of an object region in which the corresponding tracked object is represented in each image in the tracking period of the object.

Figure 9:
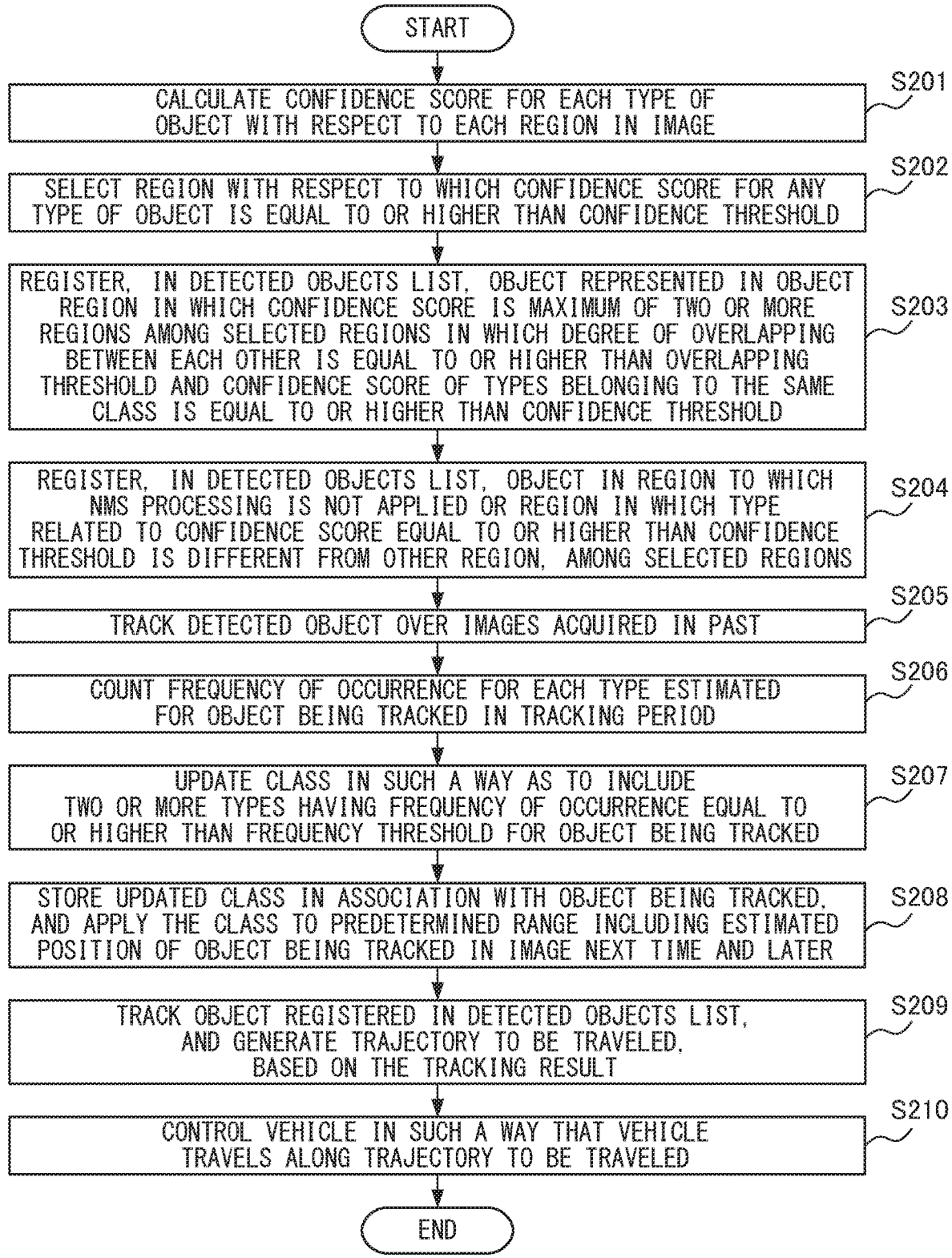
FIG. 9 is an operation flowchart of the vehicle control processing including the object detection processing according to the second embodiment.

FIG. 9 is an operation flowchart of the vehicle control processing including the object detection processing executed by the processor 23 according to the second embodiment. Every time the processor 23 receives an image from the camera 2, the processor 23 executes the vehicle control processing in accordance with the operation flowchart illustrated in FIG. 9. Note that, in the operation flowchart illustrated below, processing steps from step S201 to step S208 correspond to the object detection processing.

The confidence calculation unit 31 of the processor 23 inputs the newest image acquired by the camera 2 to the classifier to calculate, with respect to various regions in the image, a confidence score for each type of object to be detected represented in the region (step S201).

In addition, the object detection unit 32 of the processor 23 selects a region with respect to which the confidence score for any type of an object is equal to or higher than a confidence threshold for the type among of the plurality of regions to which the confidence score is calculated in the newest image acquired by the camera 2 (step S202). The object detection unit 32 then estimates that, in the object region in which the confidence score is maximum of two or more regions among the selected regions in which a degree of overlapping between each other is equal to or higher than the overlapping threshold and the confidence score of the types belonging to the same class is equal to or higher than the confidence threshold, the object of the type related to the maximum confidence score is represented (step S203). The object detection unit 32 then registers the object represented in the object region in the detected objects list. Furthermore, the object detection unit 32 sets, as the object region, a region in which a degree of overlapping for any other selected regions is less than the overlapping threshold (i.e., without application of the NMS processing) or a region in which a class to which the type having the calculated confidence score equal to or higher than the confidence threshold belongs is different from the class for the other region, among the selected regions. The object detection unit 32 then estimates that the object of the type corresponding to the confidence score equal to or higher than the confidence threshold is represented in the object region (step S204). The object detection unit 32 then registers the object represented in the object region in the detected objects list. Note that, when there is a tracked object in a previous image and a class related to the tracked object is updated, the object detection unit 32 applies the NMS processing to the updated class for a region in a predetermined range including an estimated position of the tracked object.

The tracking unit 33 of the processor 23 tracks, for each object region determined that the object is represented in the newest image, the object represented in the object region in the newest image on the basis of the object region and an object region in a past image (step S205). The frequency counting unit 34 of the processor 23 then counts, for the tracked object, a frequency of occurrence for each type of the object estimated by the object detection unit 32 during the tracking period (step S206).

When, for the tracked object, there are two or more types that are estimated to be a type of the tracked object and that have a frequency of occurrence equal to or higher than the frequency threshold, the class updating unit 38 of the processor 23 updates a class to which the NMS processing is applied in such a way as to include the two or more types (step S207). The class updating unit 38 then stores the updated class in association with the tracked object in the memory 22, and applies the updated class to the region in the predetermined range including the estimated position of the tracked object in an image acquired next time and later (step S208).

The driving planning unit 36 of the processor 23 tracks the object registered in the detected objects list with reference to the detected objects list, and generates a trajectory to be traveled of the vehicle 10 in such a way that the trajectory to be traveled is at a predetermined distance or more from a predicted path of the tracked object being estimated on the basis of the tracking result (step S209). The vehicle control unit 37 of the processor 23 then controls the vehicle 10 in such a way that the vehicle 10 travels along the trajectory to be traveled (step S210). Then, the processor 23 ends the vehicle control processing.

As described above, the object detection device according to the second embodiment calculates a frequency of occurrence for each type of an object that is detected from images acquired in time-series by using the classifier and is tracked as the same object, on the basis of an estimated result of the type during tracking of the object. When there are two or more types of an object having a frequency of occurrence equal to or greater than a frequency threshold, the object detection device then updates a class to which the NMS processing is applied for a region estimated that the object is represented in an image acquired subsequently in such a way as to include the two or more types. Thus, the object detection device can apply the NMS processing to two or more different types that occur to some extent or more of the object continuing to be tracked, and can thus suppress the same object being detected as a plurality of objects of different types even without training the classifier by using data in time-series. As a result, the object detection device can improve estimation accuracy of a type of an object to be detected while suppressing an increase in an amount of calculation and a training man-hour by the classifier. Thus, the object detection device can improve tracking accuracy of an object.

According to a modification example, the confidence calculation unit 31 in each of the embodiments described above may calculate a confidence score for each region on an image by using a classifier other than a DNN. For example, the confidence calculation unit 31 may use, as the classifier, a support vector machine (SVM) which has been trained in advance in such a way as to output, with a feature amount (e.g., HOG) calculated from a window set on an image as an input, a confidence score that an object to be detected is represented on the window. The confidence calculation unit calculates, while variously changing a position, a size, and an aspect ratio of a window to be set on an image, the feature amount from the window, and calculates the confidence score for the window, by inputting the calculated feature amount to the SVM. Note that the SVM may be prepared for each type of an object to be detected. In this case, the confidence calculation unit 31 may calculate a confidence score for each type of an object by inputting a feature amount calculated from each window to each SVM.

According to still another modification example, when the tracked object is estimated to be an object of a type having an appearance feature that varies over time in any image acquired during the tracking period (e.g., "emergency vehicle (four or more-wheeled vehicle)" or "emergency vehicle (two-wheeled vehicle)"), the frequency counting unit 34 may reduce a length of the tracking period in which counting of a frequency of occurrence is executed to be shorter than that without such an object of a type being estimated. In this way, time required until the updated confidence threshold (first embodiment) or the updated class (second embodiment) can be applied is shortened. As a result, the object detection device can improve the estimation accuracy of the type with respect to the object of the type having the appearance feature that varies over time at a relatively early stage.

According to still another modification example, the frequency counting unit 34 may calculate a frequency of occurrence for each type of an object by dividing a discrete count value of a frequency of occurrence for each of types of an object in a tracking period by the number of images (the number of frames) acquired during the tracking period. In this way, the frequency of occurrence is normalized at a length of the tracking period. Furthermore, the frequency counting unit 34 may calculate a frequency of occurrence for each type of an object by weighted-averaging a count of a detection result in such a way as to increase a specific weight of a count of a detection result (1 for a type of an object detected from an image of interest, and 0 for a type of an object that is not detected) close to the present higher than that of a count of a past detection result, instead of normalization by dividing the count value of the frequency of occurrence for each type of the object by the number of frames. For example, when a frequency of occurrence calculated last time with respect to a type=X of a certain object is $f_{t-1}(X)$, the frequency counting unit 34 calculates a current frequency of occurrence $f_t(X)$ as follows by using a weighted constant w (provided that 0<w<1). First, the frequency counting unit 34 calculates the current frequency of occurrence $f_t(X)$ before normalization according to the next equation.

```
if (X is detected){
    f_t(X) = 1 + w * f_{t-1}(X)
} else {
    f_t(X) = w * f_{t-1}(X)
}
```

Next, the frequency counting unit 34 may normalize the current frequency of occurrence $f_t(X)$ according to the following equation.

$$f_t(X) = f_t(X)/(\Sigma x f_t(X))$$

By calculating the frequency of occurrence in this way, a type more frequently estimated recently for a tracked object is more likely to be detected as a type of the tracked object in an image acquired subsequently (first embodiment). Further, a type more frequently estimated recently for a tracked object is more likely to be reflected in updating of a class to which the NMS processing is applied for an image acquired subsequently (second embodiment).

According to still another modification example, the object detection unit of the processor including the object detection device according to the first embodiment may execute the NMS processing on two or more regions having a degree of overlapping equal to or higher than an overlapping threshold, similarly to the second embodiment. In this case, the object detection unit may execute the NMS processing on the two or more regions in which an object of types estimated to belong to the same class is represented, similarly to the second embodiment. Furthermore, the threshold updating unit 35 may update a confidence threshold in such a way that, for a tracked object, a confidence threshold of a type that belongs to each class to which the NMS processing is applied and has a high frequency of occurrence is lower than a confidence threshold of a type that belongs to the class and has a low frequency of occurrence. In this way, the threshold updating unit 35 updates a confidence threshold only when types estimated for the tracked object belong to the same class, thereby mistakenly updating of the confidence threshold when objects of two or more types belonging to different classes are captured in close vicinity to each other on an image is suppressed. As a result, the object detection device can suppress an increase in false detection of an object. Still further, the processor included in the object detection device according to the first embodiment may execute processing of the class updating unit 38 according to the second embodiment, and update a class to which the NMS processing is applied for the tracked object.

According to still another modification example, the object detection device according to the embodiments or the modification examples described above may be installed in other than in-vehicle equipment. For example, the object detection device according to the embodiments or the modification examples described above may be configured to detect an object from an image generated by a surveillance camera installed in such a way as to capture a predetermined outdoor or indoor region in each predetermined period. When the object is detected for a certain period of time, the object detection device then may display, on a display connected to the object detection device, a message representing that the object is detected, or output, from a speaker connected to the object detection device, a voice representing that the object is detected.

Further, a computer program that achieves a function of each unit of the processor 23 of the object detection device according to the embodiments or modification examples described above may be provided in form of being recorded in a computer-readable portable recording medium, such as a semiconductor memory, a magnetic recording medium, or an optical recording medium.

As described above, those skilled in the art may make various changes in conformity to an embodiment within the scope of the present invention.

What is claimed is:

1. An object detection device, comprising
a processor configured to
calculate, by inputting images acquired in time-series to a classifier that calculates, for each of a plurality of types of an object to be detected, a confidence score indicating a degree of certainty that the type of the object is represented, for each of the time-series of images, the confidence score of each of the plurality of types for a plurality of regions on the image;

detect, for each of the time-series of images, in a region in which the confidence score of any of the plurality of types is equal to or higher than a confidence threshold of the type among the plurality of regions on the image, an object of the type;

track the detected object, based on the region in which the detected object is represented in each of the time-series of images;

count a frequency of occurrence for each type of the detected object in a period in which the detected object is tracked; and update the confidence threshold for at least any of two or more types of the object detected in the tracked period in such a way that the confidence threshold of a type of the object having the higher frequency of occurrence among the two or more types is lower than the confidence threshold of a type of the object having the lower frequency of occurrence among the two or more types, wherein the processor uses the updated confidence threshold for a comparison with the confidence score for a region in which the detected object is estimated to be located in an image acquired after the time-series of images.

2. The object detection device according to claim 1, wherein the processor updates, only when there is a predetermined similarity relationship between the two or more types of the object detected in the tracked period, the confidence threshold for at least any of the two or more types.

3. The object detection device according to claim 2, wherein the predetermined similarity relationship is set between types of an object having a common feature in terms of an appearance.

4. The object detection device according to claim 1, wherein the processor detects, for each of the time-series of images, in a region in which the confidence score is maximum of two or more regions in which the confidence score of any type belonging to the same class of the plurality of types is equal to or higher than a confidence threshold of the type and a degree of overlapping between each other is equal to or higher than a predetermined overlapping threshold among the plurality of regions on the image, an object of a type corresponding to the maximum confidence score, and updates, only when two or more types of the object detected in the tracked period belong to the same class, the confidence threshold for at least any of the two or more types.

5. The object detection device according to claim 1, wherein the period when any of two or more types of the detected object has an appearance feature that varies over time is set to be shorter than the period when none of two or more types of the detected object has an appearance feature that varies over time.

6. An object detection device, comprising
a processor configured to
calculate, by inputting images acquired in time-series to a classifier that calculates, for each of a plurality of types of an object to be detected, a confidence score indicating a degree of certainty that the type of the object is represented, for each of the time-series of images, the confidence score of each of the plurality of types for a plurality of regions on the image;

detect, for each of the time-series of images, in a region in which the confidence score is maximum of two or more regions in which the confidence score of any type belonging to the same class of the plurality of types is equal to or higher than a confidence threshold of the type and a degree of overlapping between each other is equal to or higher than a predetermined overlapping threshold among the plurality of regions on the image, an object of a type corresponding to the maximum confidence score;

track the detected object, based on the region in which the detected object is represented in each of the time-series of images;

count a frequency of occurrence for each type of the detected object in a period in which the detected object is tracked; and update the class in such a way as to include two or more types of the detected object when the frequency of occurrence for each of the two or more types is equal to or higher than a frequency threshold in the tracked period, wherein the processor applies the updated class to a region in which the detected object is estimated to be located in an image acquired after the time-series of images.

7. The object detection device according to claim 6, wherein the processor updates, when a first sub-class to which one of the two or more types belongs and in which whether or not the degree of overlapping is equal to or higher than the predetermined overlapping threshold is determined and a second sub-class to which the other one of the two or more types belongs and in which whether or not the degree of overlapping is equal to or higher than the predetermined overlapping threshold is determined are different, the class in such a way that the class includes both of the first sub-class and the second sub-class.

8. The object detection device according to claim 6, wherein the period when any of two or more types of the detected object has an appearance feature that varies over time is set to be shorter than the period when none of two or more types of the detected object has an appearance feature that varies over time.

9. A non-transitory recording medium in which a computer program for object detection is recorded for causing a computer to execute:

calculating, by inputting images acquired in time-series to a classifier that calculates, for each of a plurality of types of an object to be detected, a confidence score indicating a degree of certainty that the type of the object is represented, for each of the time-series of images, the confidence score of each of the plurality of types for a plurality of regions on the image;

detecting, for each of the time-series of images, in a region in which the confidence score of any of the plurality of types is equal to or higher than a confidence threshold of the type among the plurality of regions on the image, an object of the type;

tracking the detected object, based on the region in which the detected object is represented in each of the time-series of images;

counting a frequency of occurrence for each type of the detected object in a period in which the detected object is tracked; and updating the confidence threshold for at least any of two or more types of the object detected in the tracked period in such a way that the confidence threshold of a type of the object having the higher frequency of occurrence among the two or more types is lower than the confidence threshold of a type of the object having the lower frequency of occurrence among the two or more types, wherein detection of the object uses the updated confidence threshold for a comparison with the confidence score for a region in which the detected object is estimated to be located in an image acquired after the time-series of images.

10. A non-transitory recording medium in which a computer program for object detection is recorded for causing a computer to execute:

calculating, by inputting images acquired in time-series to a classifier that calculates, for each of a plurality of types of an object to be detected, a confidence score indicating a degree of certainty that the type of the object is represented, for each of the time-series of images, the confidence score of each of the plurality of types for a plurality of regions on the image;

detecting, for each of the time-series of images, in a region in which the confidence score is maximum of two or more regions in which the confidence score of any type belonging to the same class of the plurality of types is equal to or higher than a confidence threshold of the type and a degree of overlapping between each other is equal to or higher than a predetermined overlapping threshold among the plurality of regions on the image, an object of a type corresponding to the maximum confidence score;

tracking the detected object, based on a region in which the detected object is represented in each of the time-series of images;

counting a frequency of occurrence for each type of the detected object in a period in which the detected object is tracked; and updating the class in such a way as to include two or more types of the detected object when the frequency for each of the two or more types is equal to or higher than a frequency threshold in the tracked period, wherein detection of the object applies the updated class to a region in which the detected object is estimated to be located in an image acquired after the time-series of images.

* * * * *